US007009007B2

(12) United States Patent
Maehara et al.

(10) Patent No.: US 7,009,007 B2
(45) Date of Patent: Mar. 7, 2006

(54) RECYCLABLE POLYMER, PROCESS FOR PRODUCTION THEREOF, AND RECYCLING TREATMENT THEREOF

(75) Inventors: Hiroshi Maehara, Kanagawa (JP); Chieko Mihara, Kanagawa (JP); Yoshihiko Kikuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 10/443,089

(22) Filed: May 22, 2003

(65) Prior Publication Data

US 2003/0225213 A1    Dec. 4, 2003

Related U.S. Application Data

(63) Continuation of application No. PCT/JP02/13381, filed on Dec. 20, 2002.

(30) Foreign Application Priority Data

| Dec. 21, 2001 | (JP) | ............................. 2001-389887 |
| Dec. 21, 2001 | (JP) | ............................. 2001-389895 |
| Dec. 19, 2002 | (JP) | ............................. 2002-368037 |

(51) Int. Cl.
*C08C 19/22* (2006.01)
*C08C 19/30* (2006.01)
*C08C 19/34* (2006.01)

(52) U.S. Cl. ................... 525/333.7; 525/165; 525/170; 525/326.1; 525/374; 525/383; 525/384; 525/386; 525/329.1; 525/333.3

(58) Field of Classification Search ................ 525/165, 525/170, 326.1, 333.7, 374, 383, 384, 386, 525/329.1, 333.3
See application file for complete search history.

(56) References Cited

U.S. PATENT DOCUMENTS

| 5,017,458 A | 5/1991 | Soda et al. .................. 430/296 |
| 5,561,178 A | 10/1996 | Prabhu ........................ 524/95 |
| 5,569,663 A | 10/1996 | Ribier et al. ................. 514/315 |
| 5,643,998 A * | 7/1997 | Nakano et al. .............. 525/103 |
| 5,654,368 A | 8/1997 | Nakano et al. .............. 525/193 |
| 6,133,414 A | 10/2000 | Pfaendner et al. .......... 528/481 |
| 6,306,965 B1 | 10/2001 | Anderson et al. ........... 525/100 |
| 6,436,549 B1 * | 8/2002 | Wang ........................ 428/480 |
| 6,620,892 B1 | 9/2003 | Bertin et al. ................ 525/259 |
| 2002/0091172 A1 | 7/2002 | Maehara ...................... 522/88 |

FOREIGN PATENT DOCUMENTS

| DE | 195 08 709 A1 | 9/1995 |
| FR | 2 792 321 A1 | 10/2000 |
| JP | 5-140382 | 6/1993 |
| JP | 6-65440 | 3/1994 |
| JP | 6-24739 | 4/1994 |
| JP | 7-247364 | 9/1995 |
| JP | 7-324028 | 12/1995 |
| JP | 8-72058 | 3/1996 |
| JP | 9-176372 | 7/1997 |
| JP | 2000-512676 | 9/2000 |
| JP | 2001-181338 | 7/2001 |
| JP | 2002-523569 | 7/2002 |
| WO | WO 97/49737 A1 | 12/1997 |
| WO | WO 00/12566 A1 | 3/2000 |

OTHER PUBLICATIONS

T. Sawaguchi et al., "Chemical Recycling of Commodity Vinyl Polymers: Selective Preparation of End-Reactive Oligomers by Controlled Thermal Degradation," 49 *Polym. Int.* 921-925 (2000).

* cited by examiner

*Primary Examiner*—Roberto Rabago
(74) *Attorney, Agent, or Firm*—Fitzpatrick, Cella, Harper & Scinto

(57) ABSTRACT

A novel resin is provided, which is renewable with less energy. A process for renewing the resin is also provided. The present invention includes a polymer having the repeating unit represented by Structural Formula (1) $[—P_1—R—]_n$ (1). In the formula, $P_1$ indicates an addition polymer moiety having a continuous hydrocarbon chain as the skeleton containing no condensation system, and is a polymer or oligomer prepared by addition polymerization of one or more monomers having a double bond; R indicates a linking group constituted of a condensation system for linking the polymer moieties P; and n is a number of repeating units and is an integer of 2 or more.

11 Claims, 4 Drawing Sheets

RECYCLABLE POLYMER, PROCESS FOR PRODUCTION THEREOF, AND RECYCLING TREATMENT THEREOF

This application is a continuation of International Application No. PCT/JP02/13381, filed on Dec. 20, 2002, which claims the benefit of Japanese Patent Application Nos. 389887/2001 filed Dec. 21, 2001, 389895/2001 filed Dec. 21, 2001, 368037/2002 filed Dec. 19, 2002.

BACKGROUND OF THE INVENTION

1. Filed of the Invention

The present invention relates to a novel polymeric material which can be made reusable by decomposition and resynthesis. The present invention relates also to a novel process for decomposition-repolymerization of the polymeric material, and to a novel system of material circulation.

2. Related Background Art

Hitherto, various novel materials useful for living and industry have been developed sucessively by coal chemical techniques and by petrolchemical techinques. Typical examples include plastic materials such as polyethylene, polypropylene, polystyrene and polyvinyl chloride; and rubbers such as polyisoprene and polybutadiene. In recent years, resin materials having unique properties have been developed such as polyimide resins having excellent heat resistance and high impact strength, and entirely-aromatic liquid crystalline polymers.

However, such polymers are reused seldom. The polymers after disposal as waste materials will remain in the environment to impose heavy burden to the global environment. Waste materials from activities of industries and living are becoming serious as the social problems because of shortage of dumping sites, undesirable generation of dioxins on incineration, increase in carbon dioxide concentration in the air, and so forth. At the moment, development of materials and products in consideration of the global environment is being expected in connection with the carbon dioxide gas emission quotas, and waste materials. It is considered to be necessary to develop a technique which minimizes the consumption of the global resources to maintain the global environment.

In recent years, to meet the above problems, techniques have been developed for reuse of polymeric materials: for example, reuse technique such as reuse of used plastic parts after simple washing, and reworking of used resins for other uses of different added value; a material recycling technique such as molding of a used resin and a virgin resin in a sandwich state as described Japanese Patent Publication No. 6-24739; chemical recycling techniques such as decomposition of a used resin into a monomer after cutting into pieces; and thermal recycling technique such as use of waste resin as a fuel.

However, of such material recycling techniques, the reuse technique is limited to the use as the same parts. The material recycling technique has problems as to the stability of the properties owing to deterioration of the material, guarantee of the products, deterioration of appearance, and so forth. The use thereof is limited to lower grade articles practically. The chemical recycling technique is limited in the kinds of applicable materials, involving the problems of the monomer yield and a large amount of energy required for decomposition into the monomer. The thermal recycling technique has problems of the combustion heat inherent to the material, and reduction of carbon dioxide generation. Thus no recycling technique meets the requirement of the market. To meet these requirements, technical development of a novel resin which can be regenerated with a low energy, and a novel technique for regenerating the resin is wanted.

The resins are classified roughly into a condensation polymerization type polymers and an addition polymerization type polymers. The condensation polymerization type polymers typified by polyamides are readily depolymerized at the condensation sites by an acid or base, whereas the addition polymerization type polymers such as polystyrene requires a large amount of energy for depolymeization in an inert gas atmosphere under a high temperature.

Moreover, the decomposition products contain a mixture of dimer, trimer, tetramer, and so forth besides the monomer as described by T.Sawaguchi et al., Polym. Int. 49, 921 (2000). From the mixture, only the monomer which is polymerizable should be isolated, and a large amount of energy is necessary for the isolation. The yield of the recovered monomer is also important. Some of the addition polymerization polymers such as polypropylene cannot readily be depolymerized by the above-mentioned method.

Besides, decomposition of plastics using water or carbon dioxide in a supercritical state of a high temperature and a high pressure is investigated as described in Japanese Patent Laid-Open No. 8-72058. Such a method is not regarded to be the best method from the standpoint of the large-scale treatment and the large amount of energy to be inputted. Therefore, universally applicable techniques are demanded.

At the moment, the materials and products are demanded which meet the global environmental problem, such as carbon dioxide gas emission quotas and waste problems. On the other hand, minimization of consumption is required to maintain the natural resources.

The conventional addition type polymers which are synthesized by a monomer addition reaction can be regenerated for the material circulation only by chemical decomposition into the monomer.

Otherwise, a polymer can be formed from lower polymer molecules shorter in length than the practical polymer molecules as a kind of chemical parts (hereinafter the lower polymer being referred to as a "polymer" occasionally) by introducing a functional group into the parts for linkage-and-decomposition, and synthesizing the polymer from this parts. The polymer after use as an article like a molded product can be returned to the original chemical parts by breaking the linkage between the parts. The recovered parts can be formed again into a polymer by linking the parts together.

Specifically, a polymer (polymer) which has two condensable functional groups, and a molecule which has two functional groups capable of linking with the above condensable functional groups to serve as a coupler for the polymer are employed.

An example is explained below by taking a styrene polymer. A styrene polymer having a carboxyl group on each end of the molecule is employed as the two-functional polymer, and butanediol is employed as the coupling molecule having two functional groups linkable with the above functional groups of the polymer. These compounds are linked together by dehydration condensation in the presence of an acid catalyst to form a high polymer having a structure of successive linkage of the styrene polymer and the butanediol. Each of the styrene polymer moieties and butanediol moieties are linked by ester linkage.

The ester linkage can be broken by hydrolysis reaction into the original styrene polymer having a carboxyl group at the respective ends and butanediol. Thus the reaction is reversible. The compounds thus obtained can be converted into a high molecular styrene polymer by the same polycondensation reaction as above repeatedly without limitation of the repetition time basically.

SUMMARY OF THE INVENTION

Therefore,

[1] The present invention relates to Polymer (A) represented by Structural Formula (1) below:

$$[-P_1-R-]_n \quad (1)$$

(in the formula, $P_1$ indicates an addition polymer moiety having a continuous hydrocarbon skeleton containing no condensation system and formed by addition polymerization of one or more monomers having a double bond; R indicates a linking moiety comprised of a condensation system; and n is a number of repeating units and is an integer of 2 or more).

[2] The present invention relates also to the polymer stated in Item [1], wherein the linking moiety R is selected from the group consisting of —CO—O—, —CONH—, —NH—CO—O—, and —NH—CO—NH—.

[3] The present invention relates also to the polymer stated in Item [1], wherein the linkage sites of R represented by the bond between $P_1$ and R in the repeating unit of Structural Formula (1) are the same throughout the repeating units.

[4] The present invention relates also to the polymer stated in Item [1], wherein the linkage sites of R represented by the bond between $P_1$ and R in the repeating unit of Structural Formula (1) are different between the adjacent repeating units.

[5] The present invention relates also to the polymer stated in Item [1], wherein the linkage sites of R represented by the bond between $P_1$ and R in the repeating unit of Structural Formula (1) are selected at random from the linkage sites of R.

[6] The present invention relates also to the polymer stated in any of Items [1], [3], [4] and [5], wherein the linking moiety R is represented by Structural Formula (2) below:

$$X1\text{-}A\text{-}X2 \quad (2)$$

(in the formula, X1 and X2 are respectively an atomic group linked to $P_1$ in Structural Formula (1), and A is an atomic group capable of linking with X1 and X2).

[7] The present invention relates also to the polymer stated in Item [6], wherein X1 and X2 are selected respectively from the group consisting of —CO—O—, —CONH—, —NH—CO—O—, and —NH—CO—NH—.

[8] The present invention relates also to the polymer stated in Item [6], wherein X1 and X2 are the same atomic group.

[9] The present invention relates also to the polymer stated in Item [7], wherein the same atomic groups X1 and X2 are respectively —CONH—.

[10] The present invention relates also to the polymer stated in Item [6], wherein the atomic groups X1 and X2 are different from each other.

[11] The present invention relates also to the polymer stated in Item [10], wherein the linkage site of X1 and/or X2 to A is selected at random from plural linkage sites of X1 and X2, respectively.

[11'] The present invention relates also to the polymer stated in Item [10], wherein the linkage sites of X1 and/or X2 to A are the same throughout the repeating units.

[11"] The present invention relates also to the polymer stated in Item [10], wherein the linkage sites of X1 and/or X2 to A are different from each other in the adjacent repeating units.

[12] The present invention relates also to the polymer stated in Item [1], wherein the addition polymer moiety $P_1$ is at least one moiety selected from the group consisting of polystyrene, polybutadiene, polyacrylonitrile, polyethylene and polypropylene.

[13] The present invention relates also to the polymer stated in Item [6], wherein the group A is an alkylene group.

[14] The present invention relates also to the polymer stated in Item [13], wherein the alkylene group has a phenyl group on a side chain.

[15] The present invention relates also to the polymer stated in Item [13], wherein the alkylene group has a phenylene group in the main chain.

[16] The present invention relates also to the polymer stated in Item [5], wherein the group A is a phenylene group.

In the above description, the process of depolymerization for cutting selectively the linkage in the linking moiety R, and a process for molding the polymer is assumed to be conducted under relatively mild conditions.

Under severer conditions, the polymer molecules can be cut by various stresses exerted to the polymer molecules in some cases. Such cutting of the molecules does not give the original two-functional polymer after the hydrolysis, but can give a molecule having a reactive functional group on the one end only of the molecule. Such a molecule serves as a reaction-terminating agent to retard the growth of the molecule, which can prevent formation of a sufficiently high-molecular polymer.

In such a case, a compound (B) is added which has a condensable functional group and a spin-trapping group. With this compound, when the polymer (A) is cut inside the addition polymer moiety $P_1$, the compound (B) reacts with the polymer (A) to introduce the condensable functional group to the end of the molecule of the polymer (A). (Incidentally, the term "polymer" in the present invention is used occasionally for indicating a composition of the polymer represented by Structural Formula (1) containing another substance.)

Therefore,

[17] The present invention relates to a composition containing mixedly a polymer stated in Item [1], and a compound having a condensable functional group and a spin-trapping group.

[18] The present invention relates also to the composition stated in Item [17], wherein the polymer is a condensate of $P_1$ and R.

[19] The present invention relates also to the composition stated in Item [17], wherein the compound having a condensable functional group and a spin-trapping group is represented by Structural Formula (3):

$$X_3\text{-}M_1\text{-}X_4 \quad (3)$$

(in the formula, $X_3$ is a condensable functional group; $X_4$ is a spin-trapping group; $M_1$ is selected from the group consisting of —$(CH_2)_{n2}$—, —$C_6H_4$— and —$(CH_2)_{m1}$—$C_6H_4$—$(CH_2)_{m2}$— (n2, m1 and m2 are respectively an integer from 1 to 8, and —$C_6H_4$— represents a phenylene group).

[20] The present invention relates also to the composition stated in Item [19], wherein the compound having a condensable functional group and a spin-trapping group is a nitroso compound.

[21] The present invention relates to a molded article formed by molding the polymer stated in Item [1].

[22] A process for producing the polymer represented by Structural Formula (1), comprising condensation-polymerizing an addition-polymer having a functional group at each end thereof solely or in a manner of making a two-functional compound intervening therebetween:

$$[-P_1-R-]_n \tag{1}$$

(in the formula, $P_1$ indicates an addition polymer moiety having continuous hydrocarbon skeleton containing no condensation system and formed by addition polymerization of one or more monomers having a double bond; R indicates a linking moiety comprised of a condensation system for linking plural $P_1$ moieties; and n is a number of repeating units and is an integer of 2 or more).

[23] The present invention relates also to the process for producing the polymer stated in Item [22], wherein the process further comprises adding a compound having a condensable functional group and a spin-trapping group to the polymer represented by the above Structural Formula (1).

[24] The present invention relates also to the process for producing the polymer stated in Item [23], wherein the polymer represented by the above Structural Formula (1) is one stated in any of Items [2] to [16], [35], and [36].

[25] The present invention relates also to the process for producing the polymer stated in Item [23], wherein the compound having the condensable functional group and the spin-trapping group is represented by Structural Formula (3):

$$X_3\text{-}M_1\text{-}X_4 \tag{3}$$

(in the formula, $X_3$ is a condensable functional group; $X_4$ is a spin-trapping group; and $M_1$ is selected from the group consisting of $-(CH_2)_{n2}-$, $-C_6H_4-$ and $-(CH_2)_{m1}-C_6H_4-(CH_2)_{m2}-$ (n2, m1, and m2 are respectively an integer from 1 to 8).

[26] The present invention relates also to the process for producing the polymer stated in Item [22], wherein the process further comprises a step of molding the polymer represented by the above Structural Formula (1).

[27] The present invention relates to a method for treating the polymer comprising a step of providing the polymer represented by Structural Formula (1) below, and a step of depolymerizing the polymer by cutting selectively a linkage in the linking moiety R:

$$[-P_1-R-]_n \tag{1}$$

(in the formula, $P_1$ indicates an addition polymer moiety having a continuous hydrocarbon skeleton containing no condensation system and formed by addition polymerization of one or more monomers having a double bonds; R indicates a linking moiety comprised of a condensation system for linking the plural $P_1$ moieties; and n is a number of repeating units, and is an integer of 2 or more).

[28] The present invention relates also to the method for treating the polymer stated in Item [27], wherein the method comprises further a step of condensing the substance obtained by the depolymerization into a polymer.

[29] The present invention relates also to the method for treating the polymer stated in Item [27], wherein the method further comprises a step of molding the polymer obtained.

[30] The present invention relates also to the method for treating the polymer stated in Item [27], wherein the method comprises further a step of dissolving the polymer in a solvent before the depolymeization step.

[31] The present invention relates also to the method for treating the polymer stated in Item [27], wherein the linking moiety R is represented by Structural Formula (2) below, and at least one of the bonds of X1 and X2 is cut:

$$X1\text{-}A\text{-}X2 \tag{2}$$

(in the formula, X1 and X2 are respectively an atomic group linkable to the end of $P_1$ in Structural Formula (1), and A is an atomic group linkable to X1 and X2).

[32] The present invention relates also to the method for treating the polymer stated in Item [27], wherein the method further comprises a step of depolymerizing the polymer represented by the above Structural Formula (1) by addition of a compound having a condensable functional group and a spin-trapping group, and a step of condensing the substance obtained by the above depolymerization step to obtain a polymer again.

[33] The present invention relates also to the method for treating the polymer stated in Item [32], wherein the polymer represented by the above Structural Formula (1) is any of the polymers stated in Items [2] to [16], [11'], and [11''].

[34] The present invention relates also to the method for treating the polymer stated in Item [32], wherein the compound having a condensable functional group and a spin-trapping group is represented by Structural Formula (3) below:

$$X_3\text{-}M_1\text{-}X_4 \tag{3}$$

(in the formula, $X_3$ is a condensable functional group; $X_4$ is a spin-trapping group; and $M_1$ is selected from the group consisting of $-(CH_2)_{n2}-$, $-C_6H_4-$ and $-(CH_2)_{m1}-C_6H_4-(CH_2)_{m2}-$ (n2, m1, and m2 are respectively an integer from 1 to 8).

DESCRIPTION OF THE PREFERRED EMBODIMENTS

Figure 1:
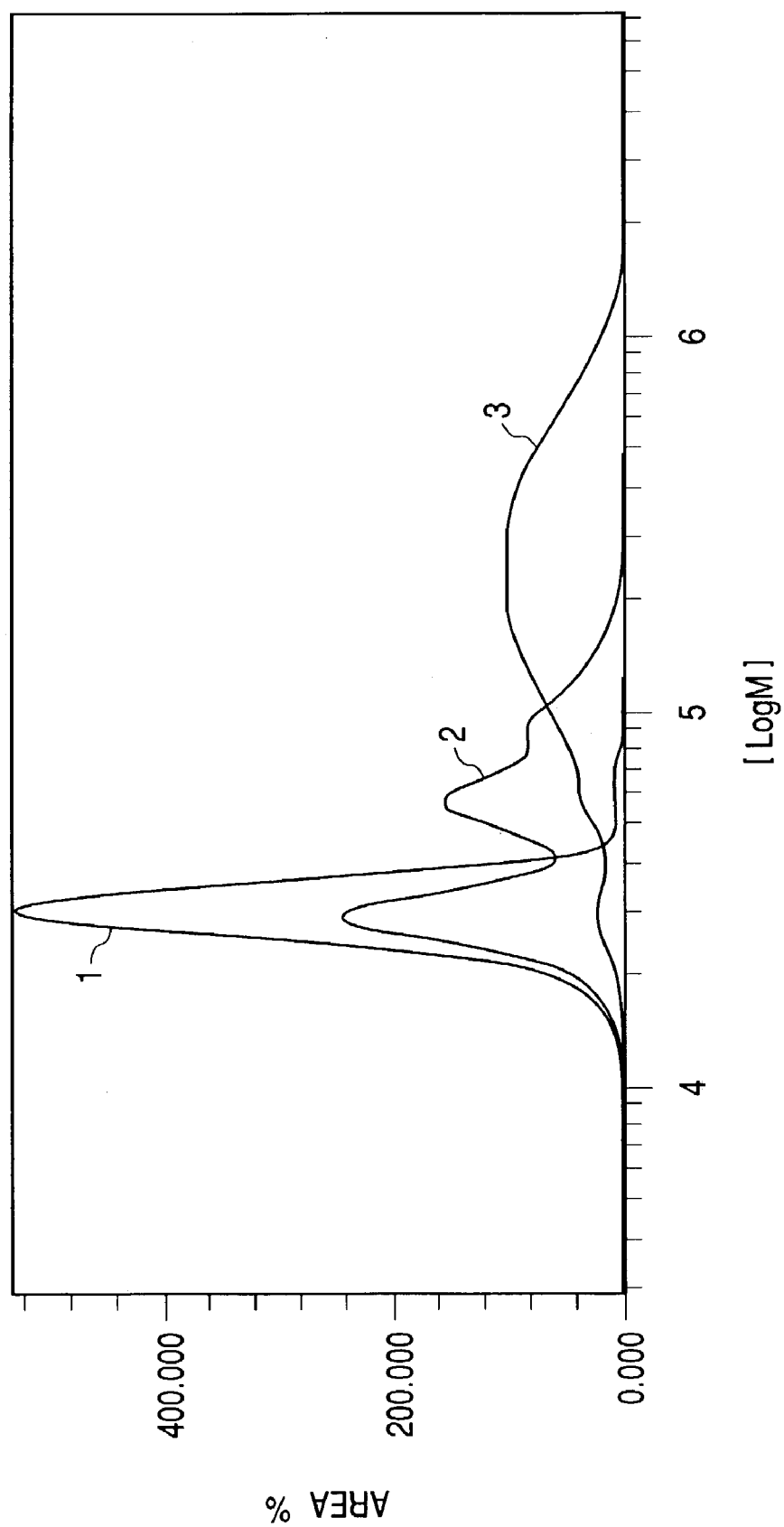
FIG. 1 shows molecular weight distribution (differential curve) by GPC of the polymer obtained in Example 10.

The present invention is described below in detail.

(Polymer)

The essential compound in the present invention is the polymer represented by Structural Formula (1):

$$[-P_1-R-]_n \tag{1}$$

In the formula, $P_1$ indicates an addition polymer moiety having a continuous hydrocarbon skeleton, namely a moiety of a polymer or oligomer formed by addition polymerization of one or more kinds of double bond-containing monomers; R indicates a linking moiety constituted of a condensation system for linking plural $P_1$ moieties; and n is a number of the repeating units and an integer of 2 or more. For selective depolymerization at the portion R, the $P_1$ moiety should not contain a condensation system such as ester linkage (mentioned later). The linking moieties R are classified roughly into two types. The types of the polymer depending on the linking moiety are explained according to the linking mode.

(Linking Mode 1)

In a first preferred mode, the addition polymer moieties $P_1$ are linked directly by a dissociable linkage without a spacer, the example including linkage of the polymer moieties $P_1$ by ester linkage (—COO—), amide linkage (—CONH—), urethane linkage (—NH—COO—), urea linkage (—NH—CO—NH—), and the like. In such a mode of linkage, the orientation direction of the linkage in the main chain may be the same along the main chain throughout the repeating units, or may be reversed alternately between the adjacent repeating units. For example, [1] in a first case, the polymer $P_1$ has a carboxyl group introduced to one end and an amino group introduced to the other end (the linkage direction in the main chain is the same throughout the repeating units), and [2] in a second case, a kind of polymer $P_1$ having a carboxyl group at the respective ends and another kind of the polymer having an amino group at the respective ends are linked together (the direction of the linkage is reversed alternately between the adjacent repeating units).

(Linking Mode 2)

In a second preferred mode, the linking moiety R is derived from a lower molecular compound represented by Structural Formula (2):

$$X1\text{-}A\text{-}X2 \qquad (2)$$

In the formula, X1 and X2 are respectively an atomic group capable of linking to the end of the addition polymer $P_1$, and A is a spacer mentioned later.

The groups X1 and X2 are dissociable, and preferably are any one selected respectively from ester linkage (—COO—), amide linkage (—CONH—), urethane linkage (—NH—COO—), urea linkage (—NH—CO—NH—). Of these the amide linkage is particularly preferable. In this linking mode, X1 and X2 may be identical, or X1 and X2 are different from each other. The combination of X1 and X2 is selected depending on ease of the availability and convenience in the depolymerization mentioned later.

In the case where X1 and X2 are different from each other, the arrangement of X1 and X2 may be the same throughout the repeating units, or may be reversed alternately between the adjacent repeating units. For example, condensation of the polymer $P_1$ having a carboxyl group on respective ends with ethanolamine, two types of linkage are possible: [1] one end of $P_1$ is amide, and the other end thereof is ester, and [2] the both end of $P_1$ is amide or ester. The type of the linkage is selected in consideration of reaction efficiency in the synthesis and the convenience in depolymerization mentioned later.

In the case where X1 and X2 are identical, X1 and X2 are dissociable (reversibly reactive). In this case, the orientation direction of the linkage may be the same throughout the repeating units, or reversed alternately between the adjacent repeating units. The type of the linkage is selected in consideration of the availability of the source materials and the convenience in the depolymeization mentioned later. For example, in the case where a polymer $P_1$ having a carboxyl group respectively at the both ends is condensed with ethanol amine, [1] $P_1$ may have an amide linkage on one end and an ester linkage at the other end, or [2] $P_1$ may have an amide linkage at the respective ends or an ester linkage at the respective ends of P. The types of the linkage is selected in consideration of reaction efficiency in the synthesis and the convenience in depolymerization mentioned later.

(Composition of Respective Constituting Components)

The addition polymer moiety $P_1$ includes specifically polymer moieties constituted of polystyrene, polybutadiene, polyacrylonitrile, polyethylene and polypropylene, and copolymers thereof. The addition polymer moiety $P_1$ should not contain condensation system like esters and amides. The polymerization degree of the polymer moiety is selected in view of the molecular weight of the entire polymer and the content of the dissociable linkage, the mechanical strength and other properties, and the ease of depolymerization. Accordingly, the range thereof cannot be decided definitely, but is preferably 2, or more, more preferably in the range from 2 to 2000 practically in view of the synthesis process.

The spacer A in the above Linking Mode 2 includes preferably those which do not impair the properties of the polymer $P_1$. The spacer A may be an aliphatic group such as an alkylene of 1–14 carbons, or an aromatic group, but is preferably a group containing at least an aromatic moiety in view of the water-resistance and the polymerization reactivity. In particular, for the block having an aromatic ring like polystyrene, preferred are an alkylene having a phenyl in the side chain (e.g., —CHPh—CH$_2$—), an alkyene having a phenylene in the main chain (e.g., —CH$_2$—Ph—CH$_2$—), and a phenylene (—Ph—).

On the other hand, the linkage moiety having the spacer A includes compounds having at least one aromatic moiety such as p-phenylenediamine, m-phenylenediamine, p-xylenediamine, m-xylenediamine, 4,4'-diaminodiphenyl ether, 3,4'-diaminodiphenyl ether, 4,4'-diaminodiphenylmethane, 3,4'-diaminodiphenylmethane, 4,4'-diaminodiphenylsulfone, 2-(4-aminophenyl)ethylamine, and 2,2'-dithiodianiline.

The spacer A includes also moieties of aliphatic compounds such as 3,3'-diaminopropylamine, and 2,2'-diaminodiethyl ether.

(Production Process)

The polymer of the present invention is synthesized by condensing a compound having a functional group on the respective both ends singly or with a bifunctional compound. Specifically, in Linking Mode 1, an addition polymer P having a functional group, such as an amino group and a carboxyl group, at the respective both ends, and the functionalized polymer is condensed in a molten state or in a solution, and if necessary, by using a catalyst or an active intermediate. In Linking Mode 2, similarly, the compound $P_1$ functionalized at the both ends and a bifunctional compound (a source material giving the moiety represented by Structural Formula (2)) are condensed. The molecular weight of the final polymer is preferably in the range of $10^4$ to $10^6$.

(Molded Article)

The polymer of the present invention can be molded into molded resin articles similar to the high polymer of the constituting addition polymer component. That is, the resin produced from the thermoplastic polymer $P_1$ component can be molded by a conventional molding process such as compression molding, extrusion molding, and injection molding, whereby a novel recyclable molded resin article can be provided as described below. The molded article may contain a plasticizer, a colorant, a filler, a stabilizer, and a flame retardant, provided that the recycling is not prevented.

(Depolymerization and Recycling)

The polymer of the present invention can be depolymerized by cutting selectively the dissociable linkage in the coupling moiety to obtain a re-condensable parts. The depolymerization can be conducted with a relatively small energy input, since the depolymerization is conducted by cutting the disociable linkage. The reaction utilized for the depolymerization is not specially limited. Readily practicable is hydrolysis reaction. For example, a molded article itself after use, or a flaked article thereof is subjected to hydrolysis with an acid or alkali catalyst under mild conditions for depolymerization of the linkage. The depolymerization facilitates removal of deteriorated portions and removal of an additive, enabling recovery of the recycling source material in a more refined state.

In Linking Mode 2, two cutting methods are applicable: in one method, both X1 and X2 in the coupling moiety R are cut; and in the other method, only one of the two is cut. In the latter method, the linking groups X1 and X2 are preferably different from each other. The selective cutting of one of the linking groups is advantageous in the case where the orientation of X1 and X2 is the same throughout the repeating units, since the depolymerization gives the repeating units as a simple product, thereby facilitating treatment for the purification and recondensation.

The depolymerization product is regenerated by recondensation without preliminary treatment or modified for reactivity, if necessary, into the original polymer (1). The polymer can be formed into molded articles. To meet the necessity, the condensation degree (n in Structural Formula (1)) may be changed, or the linking mode may be changed to control the physical properties.

(Addition of Spin-Trapping Compound)

To attain the object of the present under severe conditions such that the cutting occurs within the addition polymer moiety $P_1$, Compound (B) is preferably added which has a spin-trapping function. By reaction of Polymer (A) and Compound (B), a condensing functional group is introduced to the molecular end of the Polymer (A).

The addition of Compound (B) having a spin-trapping function is known. For example, Japanese Patent Application Laid-Open No. 9-176372 discloses addition of an isoxazolidinone compound for the purpose of stabilization of melt flow and prevention of discoloration; and Japanese Patent Application Laid-Open No. 7-324028 discloses addition of a spin-trapping compound to a cosmetic or dermatologic composition for the purpose of light protection, aging prevention, and/or acne treatment. These intend to prevent oxidation deterioration of matrix materials by trapping of peroxide radicals formed by action of oxygen or oxidation by use of the spin-trapping compound. These disclosures intends to prevent deterioration of a material, and not to restoration of a polymer molecules, and is not effective for such purposes.

On the other hand, the mechanism in the present invention is as described below. On cutting of a polymer by external stress, free radicals are formed at the cut site. A compound (B) having a condensable functional group and a spin-trapping group, if coexists, traps free radical, and consequently the condensable functional group of Compound (B) is introduced to the end of the cut end of the polymer.

The compound (B) having a condensable functional group and a spin-trapping group is represented by Structural Formula (3):

$$X_3-M_1-X_4 \quad (3)$$

Where $X_3$ is a condensable functional group, $X_4$ is a spin-trapping group, and $M_1$ is the groups represented by Structural Formula (4):

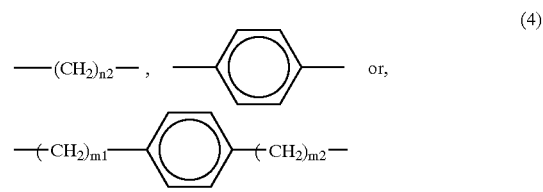

where n2, m1 and m2 are respectively an integer of 1 to 8, and the linking site on the aromatic ring may be an ortho position or a meta position differently from the para position shown in the formulas.

The condensable functional group $X_3$ is a usual condensable functional groups such as carboxyl, hydroxyl, and amino. The spin-trapping group $X_4$ is preferably a nitroso-containing group. The nitroso group-containing compound is exemplified by the compound represented by Structural Formula (5).

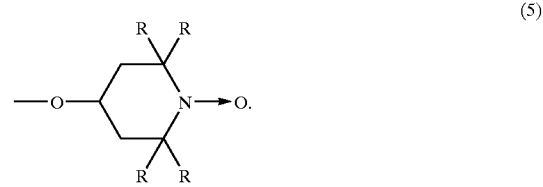

Otherwise, paranitrosodurene derivatives are useful also.

The restoration of a molecule by the above reaction is useful, for example, in the process below. Firstly, in a system in which the addition polymer having a condensable functional group at the respective ends of the molecule is used for repeated polymerization-depolymerization, especially, in the depolymerization step, the molecule can be cut by agitation or a like operation. In this step, the compound having a condensable functional group and a spin-traping group, if present, will trap the radical formed by the cutting by the spin-trapping group. In this process, if the oxygen present in the polymer solution when the molecule is cut, the reactive oxygen reacts selectively with the radical formed by cutting to form unwanted peroxide radical. Therefore, the oxygen should be removed completely from the solution by bubbling an inert gas like nitrogen into the solution, and the reaction itself should be conducted in an inert gas atmosphere.

Next, in a process in which the high polymer obtained by the polymerization is molded, a compound having a condensable functional group and a spin-trapping group is preferably mixed into the polymer preliminarily. In the molding machine, heat and a shearing stress applied to the resin cause scission of the molecular chain, but the radical formed by molecular scission is trapped even in the solid phase by the spin-trapping group.

The concentration of the compound having the condensable functional group and the spin-trapping group to be mixed ranges, in the former case of the solution reaction, preferably from 0.01% to 5%, more preferably from 0.1% to 3% based on the source resin, and in the latter case of the solid operation, ranges preferably from 0.1% to 5% since the movement of the molecule is restricted in the solid phase in comparison with the reaction in the solution.

As described above, in the technique of polymerization-depolymerization using a polymer having two functional groups and a coupling compound capable of linking to the two functional group, the addition of a compound having a condensable functional group and a spin-trapping group can improve the reproducibility of the repetition, and reliability of the reaction such as the yield, purity, and properties of the resin. With this technique, the regeneration cycles can be increased significantly. That is, the resin used as molded articles or packaging materials can be recovered and depolymerized for reuse as the source material of the resin. Thus the regenerated resin produced by the repolymerization is useful without lowering the level of the usage. Such technique will change greatly the recycle techniques which are limited in application.

Moreover, the technique of the present invention can be combined with various conventional techniques such as reuse techniques for molded articles, material recycling techniques for sandwich molding, chemical recycling techniques of decomposition of a resin to the source monomer, and thermal recycling technique of utilizing heat of combustion, and so forth, without limiting the material recycling model.

EXAMPLES

The present invention is described below specifically without limiting the present invention.

Example 1

Synthesis of Ester-Linked Polymer Having Spacer, 1

In a flask, were placed 2 g of 1,4-butanediol, and 5 g of a polystyrene having a carboxylic acid group at the respective ends (Mw: 25,000, produced by Scientific Polymer Product Co,; Mw indicates a weight-average molecular weight). The mixture was heated to 180° C. in a nitrogen atomosphere. Thereto was added 35 mg of tetraisopropyl orthotitanate diluted with 100 μL of toluene, and the mixture was stirred. Then the mixture was kept at a temperature of 180–200° C. to remove the water formed and the diol by distillation. The reaction was continued under a reduced pressure to the final pressure of 6.67 kPa. The reaction product was taken out in a hot state from the flask to obtain a polymer in a white wax state (Compound No. A-1).

The molecular weight was measure by gel permeation chromatography (herein after referred to as "GPC") under the measurement conditions shown below.

Measurement apparatus: HLC 8120 GPC (Tosoh Corp.)
Columns: TSKgel SuperHZM-M+HZM-N
Elution Liquid: THF, 40° C.
Standard: Polystyrene (Polymer Laboratories Co.)

The weight-average molecular weight of the resulting polymer was 400,000, and therefore the number (n) of the repeating units is estimated to be about 16.

Examples 2 to 5

Syntheses of Ester-Linked Polymer Having Spacer, 2 to 5

The synthesis was conducted under the same conditions as in Example 1 except that the polymer moiety (P) of the polystyrene (PS) having a carboxyl group at the respective ends was replaced by a moiety of polystyrene of a different molecular weight, polypropylene, or polyethylene (PE); and 1,4-butanediol was replaced by another diol.

Table 1 below shows Examples 1 to 5 specifically.

For simplicity of representation, Synthesis Example 1 is summarized as A-1 in the table, in which the ester-linked polymer of the number of repeating units (n) of 16 was prepared from 1,4-butanediol and the polystyrene having a carboxylic acid group at the both ends (Mw: 25,000, Mw representing weight-average molecular weight). Examples 2 to 5 are summarized in the same style.

TABLE 1

| Example No. | Compd No. | P (Mw) | X1 | A | X2 | n |
|---|---|---|---|---|---|---|
| 1 | A-1 | PS (25,000) | COO | 1,4-C$_4$H$_8$ | OCO | 16 |
| 2 | A-2 | PS (15,000) | COO | 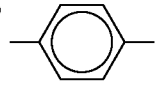 | OCO | 4 |
| 3 | A-3 | PP (5,000) | COO | 1,8-C$_8$H$_{16}$ | OCO | 70 |
| 4 | A-4 | PS (50,000) | COO | 2,5-C$_6$H$_{12}$ | OCO | 9 |
| 5 | A-5 | PS (100,000) | COO | —CH$_2$—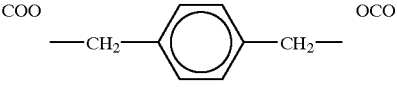—CH$_2$— | OCO | 3 |

Example 6

Synthesis of Amide-Linked Polymer Having Spacer, 1

A 5-gram portion of polystyrene dicarboxylic acid having a carboxyl group at the respective ends (Mw: 15,000) was suspended in 100 mL of ethanol. To this suspension, was added a solution of 0.2 g of hexane-1,6-diamine in 10 mL ethanol. The mixture was stirred at room temperature. Thereby white precipitate was formed with heat generation. After completion of the reaction, the crystalline matter was collected by filtration, and washed with ethanol twice to obtain a nylon salt. A 3-gram portion of this nylon salt was placed in a flask, and after purging with nitrogen, the salt was heated with gradual evacuation to melt the salt. The content in the flask became viscous gradually to form a pale yellow opaque polymer (Compound No. B-1).

The resulting polymer had a weight-average molecular weight of 465,000 according to GPC measurement, and the number of the repeating units (n) was estimated to be about 31.

Examples 7 to 9

Synthesis of Amide-Linked Polymer Having Spacer, 2 to 4

Polymers were prepared under the same conditions and in the same manner as in Example 6 except that the polymer moiety (P) of the polystyrene (PS) having the carboxyl groups at the respective ends was changed to polystyrene of different molecular weight or polypropylene (PP), and the hexane-1,6-diamine was changed to another diol compound.

Table 2 below shows Examples 6 to 9 specifically.

For simplicity of representation, Synthesis Example 6 in which the amide-linked polymer of the number of repeating units (n) of 31 was prepared from hexane-1,6-diamine and the polystyrene having a carboxyl group at the respective ends (Mw: 15,000, Mw representing weight-average molecular weight) is summarized as B-1 in the table. Examples 7 to 9 are summarized in the same style.

Example 10

Synthesis of Amide-Linked Polymer Having Spacer, 5

In a flask equipped with a nitrogen-introducing tube and a stirrer, were placed 5.0 g (0.2 mmol) of PS dicarboxylic acid having Mw of 25,000; 40.05 mg (0.2 mmol) of 4,4'-diaminophenyl ether; 248 mg (0.8 mmol) of triphenyl phosphite; and 30 mg of lithium chloride. The mixture in the flask was dissolved in 2 mL of N-methylpyrrolidone (NMP) and 0.2 mL of pyridine. The solution was stirred at 100° C. for one hour in a nitrogen atmosphere. The resulting polymer solution was poured into 200 mL of methanol, and the deposited polymer was collected by filtration. The collected polymer was refluxed in 100 mL of methanol for one hour to remove the remaining solvent and condensing agent. Then the polymer was collected by filtration and was dried in vacuo to obtain a white fibrous polymer (Compound No. B-5).

The molecular weight was measure by GPC under the measurement conditions shown below.

Measurement apparatus: HLC 8120 GPC (Tosoh Corp.)
Columns: TSKgel SuperHZM-M+HZM-N
Elution Liquid: THF, 40° C.
Standard: Polystyrene (Polymer Laboratories Co.)

The weight-average molecular weight of the resulting polymer was 370,000, and the number (n) of the repeating units is estimated to be about 11. FIG. 1 shows the molecular weight distribution (differential curve) as measured by GPC. In FIG. 1, curve 1 corresponds to the source PS, the curve 2 corresponds to the intermediate state during the polymerization, and curve 3 corresponds to the final polymer.

Figure 2:
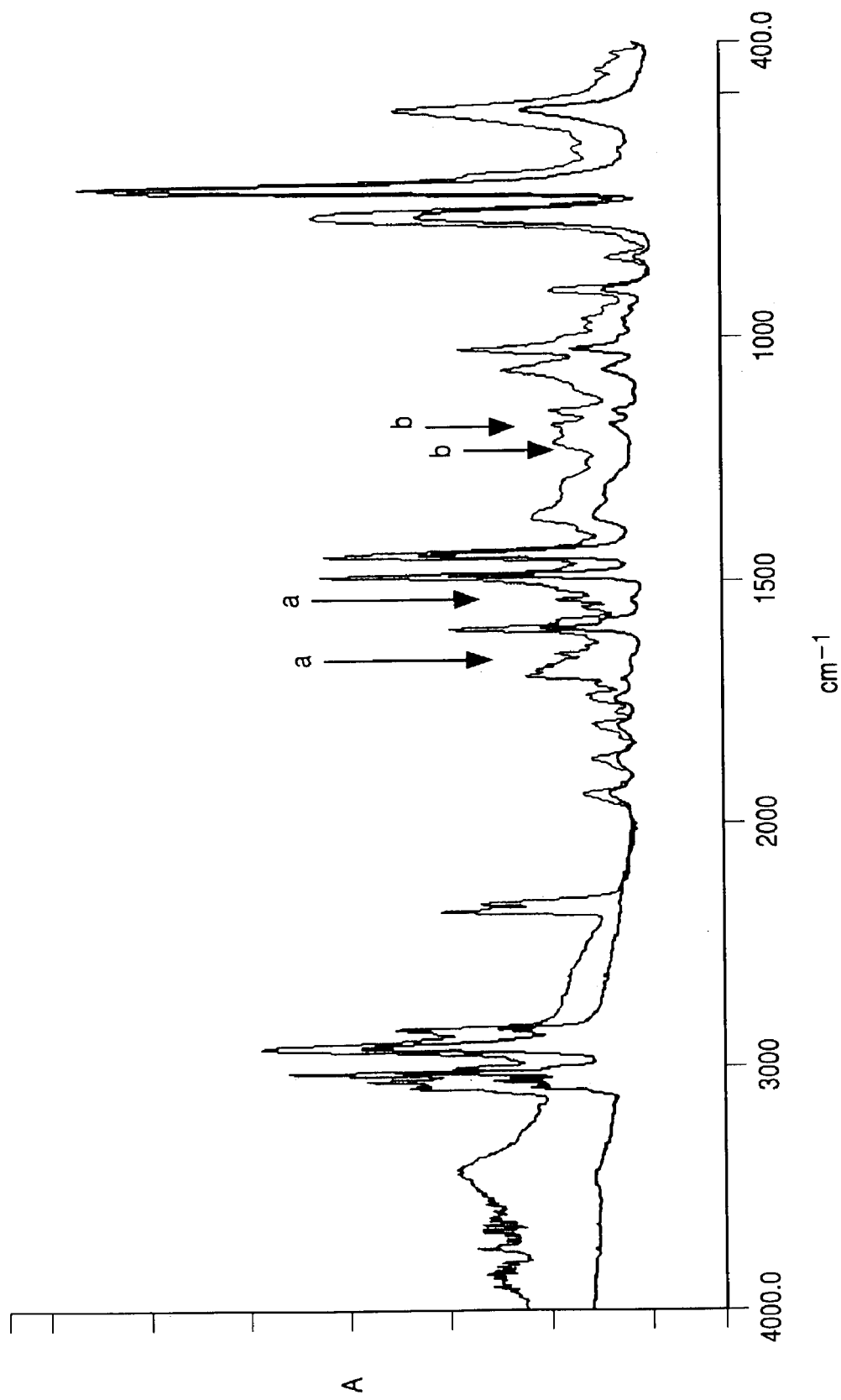
FIG. 2 shows the results of FT-IR measurement of the polymer obtained in Example 10.

FIG. 2 shows the measurement results of FT-IR of the obtained polymer. The measurement was conducted by a KBr tablet method by means of the apparatus 1720X (Perkin Elmer Co.).

The absorption peaks a of Amide I are found at 1687 cm$^{-1}$ and 1653 cm$^{-1}$. The absorption peak a of Amide II is found at 1560 cm$^{-1}$. The absorption peaks b of the aromatic ether are found at 1262 cm$^{-1}$ and 1217 cm$^{-1}$. Thereby it was confirmed that the polymer had been formed by the amide linkage.

Figure 3:
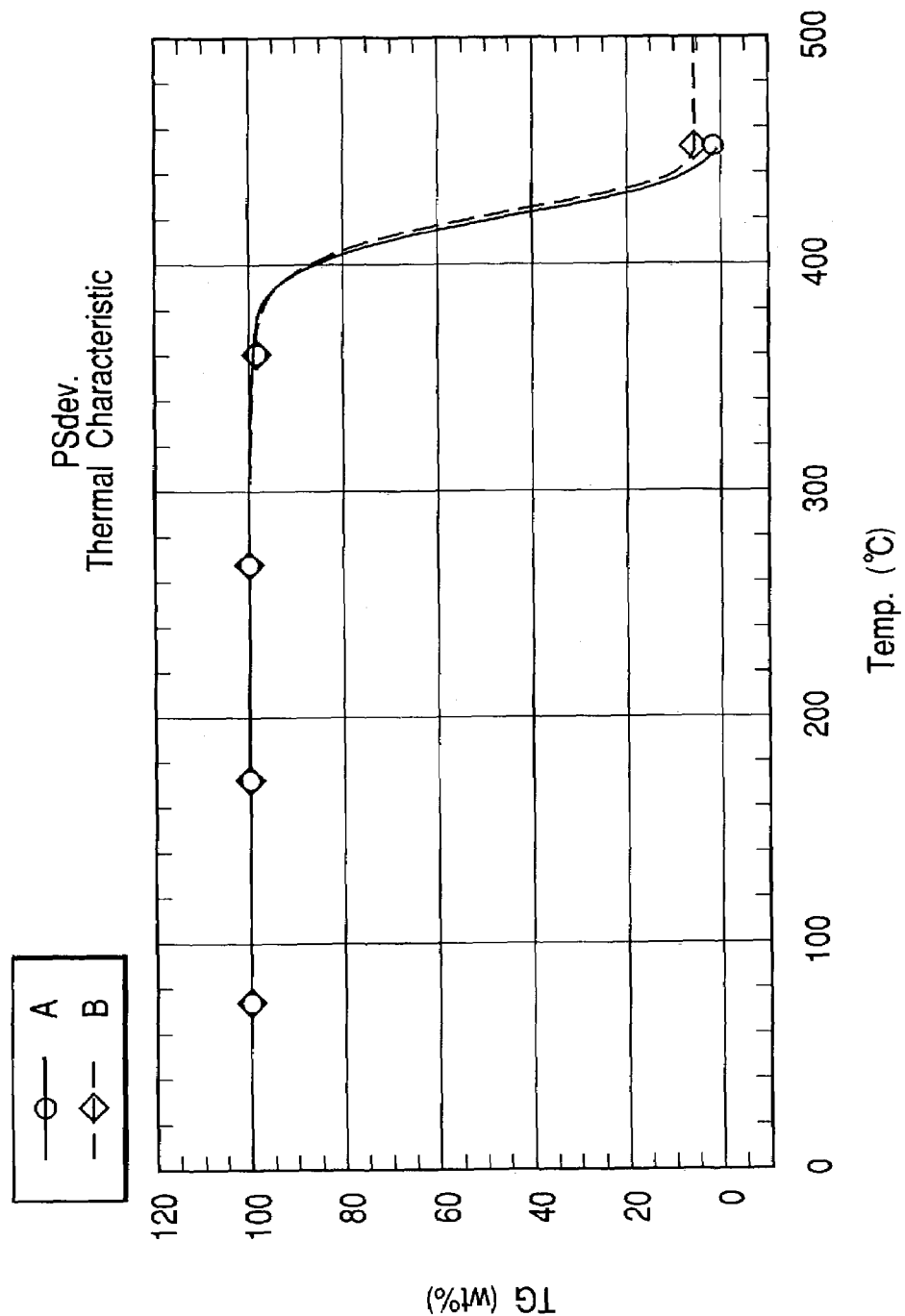
FIG. 3 shows the results of measurement of thermal decomposition characteristics of the polymer obtained in Example 10.

Thermal decomposition characteristics were measured by thermogravimetry (TG) by TG-DTA 2000 S (MacScience Co.) in the temperature range up to 500° C. at a temperature elevation rate of 10° C./min in $N_2$ gas. FIG. 3 shows the measurement results. In FIG. 3, the curve A corresponds to the polymer obtained in this Example, and the curve B corresponds to the commercial PS.

FIG. 3 shows that the polymer of this Example has the same thermal decomposition characteristics with the same thermal decomposition initiation temperature and the same heat resistance as the PS (PS Wako Junyaku K.K.) having no amide linkage.

TABLE 2

| Example No. | Compd No. | P (Mw) | X1 | R — A | X2 | n |
|---|---|---|---|---|---|---|
| 6 | B-1 | PS (15,000) | CONH | 1,6-$C_6H_{12}$ | NHCO | 31 |
| 7 | B-2 | PS (100,000) | CONH | 1,3-$C_6H_6$ | NHCO | 7 |
| 8 | B-3 | PP (50,000) | CONH | 2,5-$C_5H_{10}$ | NHCO | 24 |
| 9 | B-4 | PE (2,000) | CONH |  | NHCO | 10 |

Example 11

Synthesis of Amide-Linked Polymer Having Spacer, 6

In a flask equipped with a nitrogen-introducing tube and a stirrer, were placed 10.0 g (0.4 mmol) of PS dicarboxylic acid having Mw of 50,000; 80.25 mg (0.4 mmol) of 4,4'-diaminophenylmethane; 490 mg (0.8 mmol) of triphenyl phosphite; and 60 mg of calcium chloride. The mixture in the flask was dissolved in 4 mL of NMP and 0.4 mL of pyridine. The solution was stirred at 100° C. for two hours in a nitrogen atmosphere. The resulting polymer solution was poured into 400 mL of methanol, and the deposited polymer was collected by filtration. The collected polymer was refluxed in 200 mL of methanol for one hour. Then the polymer was collected by filtration and was dried in vacuo to obtain a white fibrous polymer (Compound No. B-6). The weight-average molecular weight of the polymer was 520,000 according to GPC measurement.

Example 12

Synthesis of Amide-Linked Polymer Having Spacer, 7

In a flask equipped with a nitrogen-introducing tube and a stirrer, were placed 12.5 g (0.25 mmol) of polyethylene-dicarboxylic acid having Mw of 4,000; 54.1 mg (0.5 mmol) of p-phenylenediamine; 310 mg (1 mmol) of triphenyl phosphite; 100 mg of lithium chloride; and 300 mg of calcium chloride. The mixture in the flask was dissolved in 5 mL of NMP and 1 mL of pyridine. The solution was stirred at 100° C. for 6 hours in a nitrogen atmosphere. The polymer solution was poured into 300 mL of methanol, and the deposited polymer was collected by filtration. The collected polymer was refluxed in 150 mL of methanol for one hour. Then the polymer was collected by filtration and was dried in vacuo to obtain a white fibrous polymer (Compound No. B-7). The weight-average molecular weight of the polymer was 120,000 according to GPC measurement.

Example 13

Synthesis of Amide-Linked Polymer Having Spacer, 8

In a flask equipped with a nitrogen-introducing tube and a stirrer, were placed 10.0 g of polypropylene-dicarboxylic acid having Mw of 5,000; 80 mg of p-xylenediamine; and 500 mg of triphenyl phosphite. The mixture in the flask was dissolved in 4 mL of NMP and 1 mL of pyridine. The solution was stirred at 100° C. for 5 hours in a nitrogen atmosphere. The resulting polymer solution was poured into 400 mL of methanol, and the deposited polymer was collected by filtration. The collected polymer was refluxed in 200 mL of methanol for one hour. Then the polymer was collected by filtration and was dried in vacuo to obtain a white fibrous polymer (Compound No. B-8). The weight-average molecular weight of the polymer was 90,000 according to GPC measurement.

Example 14

Synthesis of Amide-Linked Polymer Having Spacer, 9

In a flask equipped with a nitrogen-introducing tube and a stirrer, were placed 10.0 g of α-amino-ω-carboxy-terminated-polyethylene (Mw 4,000); 500 mg (0.8 mmol) of triphenyl phosphite; and 60 mg of lithium chloride. The mixture in the flask was dissolved in 5 mL of pyridine. The solution was stirred at 100° C. for 5 hours in a nitrogen atmosphere. The resulting polymer solution was poured into 400 mL of methanol, and the deposited polymer was collected by filtration. The collected polymer was refluxed in 200 mL of methanol for one hour. Then the polymer was collected by filtration and was dried in vacuo to obtain a white fibrous polymer (Compound No. B-9). The weight-average molecular weight of the polymer was 20,000 according to GPC measurement.

Example 15

Synthesis of Ester-Linked Polymer Having No Spacer, 1

A 3-gram portion of α-hydoxy-ω-carboxy-terminated-polystyrene (Mw: 50,000, Polymer Science Co.) was placed in a flask, and was heated to 180° C. in a nitrogen atmosphere. Thereto, 35 mg of dibutyltin oxide was added and stirred. The formed water and diol were removed by distillation at the temperature kept at 180–200° C. The reaction was continued at a reduced pressure. Then the reaction product was taken out from the flask while it was hot to obtain white polymer (Compound C-1). The weight-average molecular weight of the obtained polymer was 700,000 according to GPC measurement. The number of the repeating units was estimated to be about 14.

Examples 16 and 17

(Synthesis of Ester-Linked Polymers Having No Spacer, 2-3)

Ester-linked polymers of Examples 16 and 17 were synthesized under the same conditions as in Example 15 except that the β-hydroxy-ω-carboxy-terminated polystyrene was changed to a polystyrene having different molecular weight or to a polyethylene.

Examples 18 and 19

(Synthesis of Amide-Linked Polymers Having No Spacer, 1 and 2)

Amide-linked polymers of Examples 18 and 19 were synthesized under the same conditions as in Example 15 except that the α-hydroxy-ω-carboxy-terminated-polystyrene was changed into α-amino-ω-carboxy-terminated-polystyrene or -polypropylene.

Table 3 shows the results of Examples 15 to 19.

For simplicity of representation, Synthesis Example is summarized as C-1 in the table in which the linked polymer of the number of repeating units (n) of 14 was prepared from α-hydorxy-ω-carboxy-terminated-polystyrene (Mw: 50,000, Mw representing weight-average molecular weight). Examples 16 to 19 are summarized in the same style. Incidentally, in the case where α-amino-ω-carboxy-terminated-polystyrene was used, R is represented by CONH.

TABLE 3

| Example No. | Compound No. | P | R | n |
|---|---|---|---|---|
| 15 | C-1 | PS (50,000) | COO | 14 |
| 16 | C-2 | PS (5000) | COO | 8 |
| 17 | C-3 | PE (20,000) | COO | 27 |
| 18 | D-1 | PP (4000) | CONH | 4 |
| 19 | D-2 | PS (10,000) | CONH | 21 |

Example 20

(Synthesis of Amide-Linked Polymers Having No Spacer, 3)

A 3-gram portion of α-amino-ω-carboxy-terminated-polystyrene (Mw 50,000) was placed in a flask, and was heated to 180° C. in a nitrogen atmosphere. Thereto, 35 mg of dibutyltin oxide was added and stirred. The formed water and diol were removed by distillation at the temperature kept at 180–200° C. The reaction was continued at a reduced pressure. Then the reaction product was taken out from the flask while it was hot to obtain white polymer (Compound D-3).

The weight-average molecular weight of the obtained polymer was 500,000 according to GPC measurement.

Example 21

Synthesis of Urethane-Linked Polymer Having Spacer, 1

Distilled chlorobenzene and o-dichlorobenzene were mixed at a mixing ratio of 80/20 (vol/vol). This mixed solvent was used as the reaction solvent. A 3-gram portion of 1,4-butanediol and 120 mL of the solvent were placed in a four-neck flask equipped with a stirrer, a thermometer, a nitrogen-introducing tube, and a reflux condenser with a drying tube attached. The flask was purged sufficiently with nitrogen, and then the nitrogen-introducing tube was changed to a dropping funnel with a drying tube attached thereto. In the dropping funnel, were placed 5 g of polystyrene having a terminal isocyanate group at the respective ends, and 60 mL of the solvent. The flask was heated with stirring. With the start of stirring, half of the content in the dropping funnel was added in one lot to the flask with vigorous stirring. The remaining half of the dropping funnel content was added dropwise in 3 hours, and thereafter the reaction mixture was refluxed for one hour. After cooling to room temperature, the deposited polymer was collected by filtration. The polymer was dissolved in hot dimethylformamide. Thereto 50 mL of methanol was added and the mixture was left standing in a refrigerator overnight. The reprecipitated polymer was collected by filtration and vacuum-dried (Compound No. E-1).

The weight-average molecular weight of the resulting polymer was 300,000, and the polymerization degree was estimated to be about 30.

Examples 22 to 25

Synthesis of Urethane-Linked Polymers Having Spacer, 2 to 5

The synthesis was conducted in the same manner as in Example 21 except that the polymer moiety (P) of the polystyrene (PS) having terminal isocyanate groups at the respective ends was changed to a polystyrene of a different molecular weight, polypropylene (PP), or polyethylene (PE), and the 1,4-butanediol was changed to another diol compound.

Table 4 shows specifically Examples 21 to 25.

For simplicity of representation, Synthesis Example of Example 21 is summarized as E-1 in the table, in which the linked polymer of the number of repeating units (n) of 30 was prepared from 1,4-butanediol and polystyrene having a terminal isocyanate group at the respective ends (Mw: 10,000, Mw representing weight-average molecular weight). Examples 22–25 are summarized in the same style.

TABLE 4

| Example No. | Compd No. | P | R | | | n |
|---|---|---|---|---|---|---|
| | | | X1 | A | X2 | |
| 21 | E-1 | PS (10,000) | OCONH | 1,4-$C_4H_8$ | NHOCO | 30 |
| 22 | E-2 | PS (5,000) | OCONH | 1,12-$C_{12}H_{24}$ | NHOCO | 22 |
| 23 | E-3 | PP (50,000) | OCONH | $C_2H_4$ | NHOCO | |
| 24 | E-4 | PE (10,000) | OCONH | 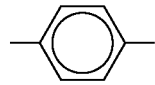 | NHOCO | 6 |
| 25 | E-5 | PS (25,000) | OCONH | 1,8-$C_9H_{18}$ | NHOCO | 12 |

Example 26

Synthesis of Urea-Linked Polymer Having Spacer, 1

Chlorobenzene and o-dichlorobenzene both having had been distilled were mixed at a mixing ratio of 80/20 (vol/vol). This mixed solvent was used as the reaction solvent. A 3-gram portion of hexane-1,6-diamine and 120 mL of the solvent were placed in a four-neck flask equipped with a stirrer, a thermometer, a nitrogen-introducing tube, and a reflux condenser with a drying tube attached. The flask was purged sufficiently with nitrogen, and then the nitrogen-introducing tube was changed to a dropping funnel with a drying tube attached thereto. In the dropping funnel, were placed 5 g of polystyrene having an isocyanate group at the respective ends (Mw 5000), and 60 mL of the solvent. The flask was heated with stirring. With the start of the stirring, half of the content in the dropping funnel was added in one lot to the flask with vigorous stirring. The remaining half of the dropping funnel content was added dropwise in 3 hours, and thereafter the reaction mixture was refluxed for one hour. After cooling to room temperature, the deposited polymer was collected by filtration. The polymer was dissolved in hot dimethylformamide. Thereto 50 mL of methanol was added and the mixture was left standing in a refrigerator overnight. The reprecipitated polymer was collected by filtration and vacuum-dried (Compound No. F-1)

The weight-average molecular weight of the resulting polymer was 100,000 according to GPC measurement, and the number of the repeating units (n) was estimated to be about 20.

Table 5 shows specifically Examples 26.

For simplicity of representation, Synthesis Example of Example 26 is summarized as F-1 in the table in which the urea-linked polymer of the number of repeating units (n) of 20 was prepared from hexane-1,6-diamine and polystyrene having an isocyanate group at the respective ends (Mw: 5,000, Mw representing weight-average molecular weight).

TABLE 5

| Example No. | Compd No. | P | X1 | R A | X2 | n |
|---|---|---|---|---|---|---|
| 26 | F-1 | PS (5,000) | NHCONH | 1,6-$C_6H_{12}$ | NHCONH | 20 |

Examples 27 to 33

Molding

The powdery polymers synthesized in the above Examples were molded by the methods shown in Table 6, As a result, satisfactory molded articles were obtained.

TABLE 6

| Example No. | Polymer | Method | Conditions | Shape |
|---|---|---|---|---|
| 27 | B-4 | Compression | 200° C., 3 MPa | Square plate 20 cm × 20 cm × 3 mm |
| 28 | D-4 | Compression | 200° C., 3 MPa | Square plate 20 cm × 20 cm × 3 mm |
| 29 | C-1 | Extrusion | 220° C., 100 rpm Single screw | Round bar 5 mm φ |
| 30 | A-1 | Injection | 220° C. (Tip) Inj. pressure 90 MPa | Cup 5 cm φ × 7 cm 1 mm thick |
| 31 | B-5 | Compression | 200° C., 3 MPa | Square plate 20 cm × 20 cm × 3 mm |
| 32 | B-9 | Extrusion | 210° C., 100 rpm Single screw | Round bar 5 mm φ |
| 33 | B-6 | Injection | 220° C. (Tip) Inj. pressure 80 MPa | Cup 5 cm φ × 7 cm 1 mm thick |

Example 34

Recycling

The molded article formed in Example 30 was crushed. A 10-gram portion of the crushed matter was dissolved in 400 mL of toluene. Thereto 400 mL of aqueous 1-mol/L (1N) sodium hydroxide solution was added. The mixture was stirred at 100° C. for 24 hours. The molecular weight of the polymer was confirmed by GPC to have decreased to the value of the starting polystyrene polymer. After removal of the solvent by distillation, the recovered matter was washed with aqueous 10% acetic acid solution, further washed with ethanol, and dried. The recovered matter was confirmed to be a polystyrene derivative by infrared spectrometry. The recovered powdery matter was treated for the synthesis in the same manner as in Example 1. Thereby the same results were obtained.

Example 35

Recycling

Figure 4:
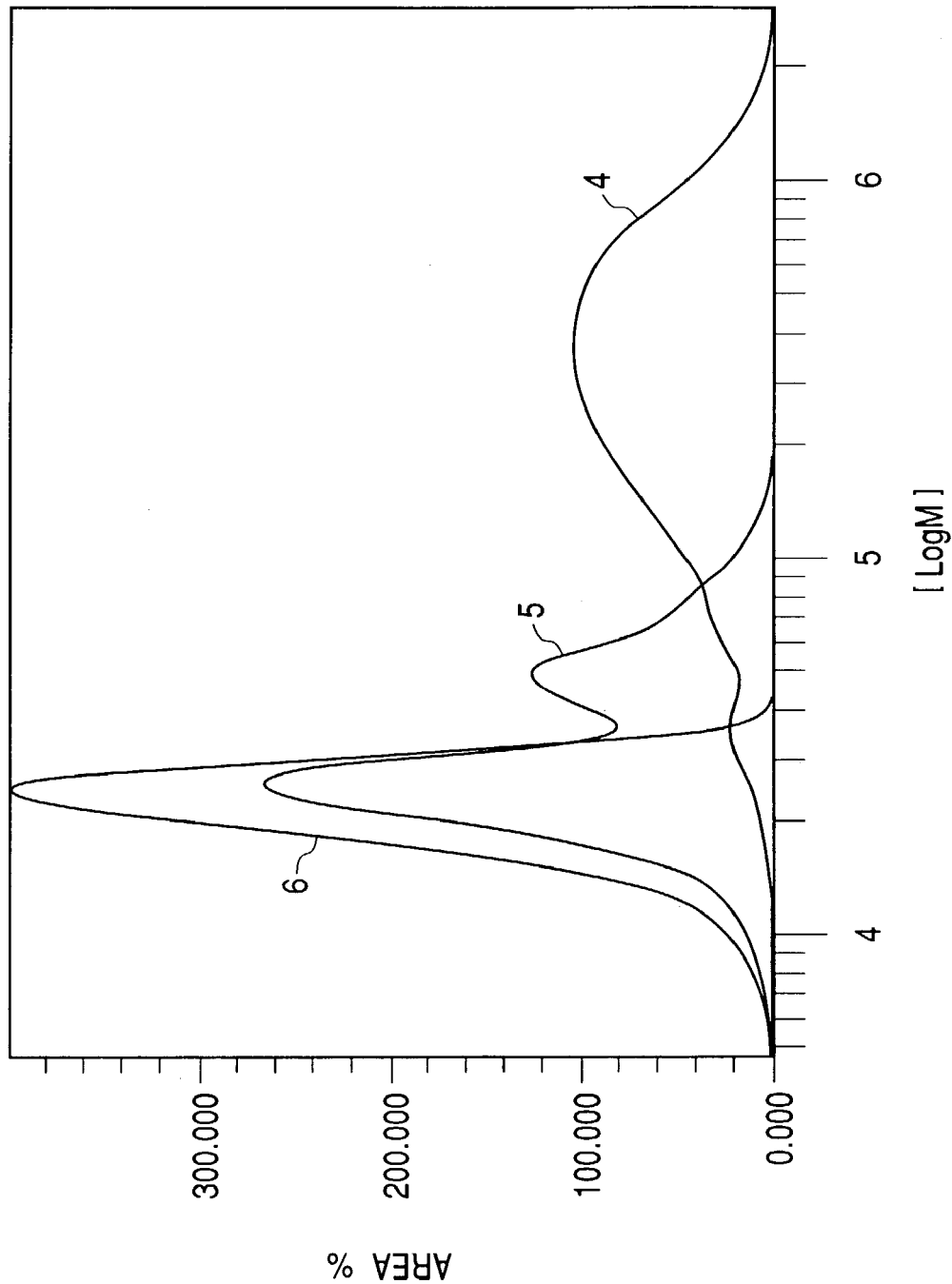
FIG. 4 shows molecular weight distribution (differential curve) by GPC of the polystyrene polymer decomposed and recovered in Example 35.

The molded article formed in Example 31 was crushed. A 10-gram portion of the crushed matter was dissolved in 300 mL of xylene. Thereto 100 mL of 94% sulfuric acid was added, and the mixture was stirred at 110° C. for 27 hours. FIG. 4 shows the differential curves of the molecular weight distribution. In FIG. 4, curve 4 corresponds to the molded polymer article, curve 5 corresponds to a treated polymer after 7 hours from starting the treatment, and curve 6 corresponds to the recycled matter. As shown in FIG. 4, it was confirmed by GPC that the molecular weight of the polymer decreased to the value of the starting polymer of styrene polymer. After removal of the solvent by distillation, the recovered matter was washed with aqueous 1-mol/L (1N) sodium hydrogencarbonate solution, further washed with ethanol, and dried. The recovered matter was confirmed by infrared spectrometry to be a polystyrene derivative. The recovered powdery matter was used for the synthesis in the same manner as in Example 10, whereby the same results were obtained.

Example 36

(Synthesis of Polymer, 1)

A styrene polymer having a carboxyl group at the respective ends and having a molecular weight of 25,000 is employed as the polymer having two condensable functional groups. Butanediol was employed which has two functional groups linkable to the two carboxyl groups, as the coupler for the aforementioned polymer. These compounds are heated to 180° C. in a flask. Thereto, titanium isopropoxide is added in an amount of 0.5 mass % as the catalyst with stirring. The reaction flask is purged by gaseous nitrogen and evacuated gradually to 6.67 kPa to remove the water formed by the dehydration condensation. After 3 hours of reaction, the polymer is recovered.

(Decomposition of Polymer, 1)

The synthesized polymer is dissolved N,N'-dimethylformamide (DMF) at a concentration of 10 mass %. Thereto, 1 mol/L (1N) hydrochloric acid is added and the mixture is stirred at 40° C. for 5 hours to hydrolyze the polymer. In the hydrolysis, the compound represented by Structural Formula (6) below is added thereto in an amount of 0.1% as the compound having a condensable functional group and a spin-trapping group.

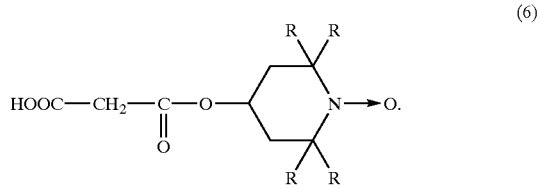

(6)

The resulting styrene polymer having a carboxyl group at the respective ends of the molecule and having a molecular weight of 25,000 is recovered by repetition of dissolution in toluene and precipitation by methanol. The butanediol formed by the decomposition is recovered by distillation.

(Resynthesis of Polymer, 1)

A polymer is synthesized by using, as the starting materials, the recovered styrene polymer having a carboxyl group at the respective ends and having a molecular weight of 25,000 and butanediol, in the same manner as in "Synthesis of Polymer, 1" described above.

The polymer obtained in "Synthesis of Polymer, 1" and the polymer obtained in "Resynthesis of Polymer, 1" are confirmed to be equivalent by molecular weight distribution measurement by GPC.

Example 37

(Molding of Polymer, 1)

The polymer having been synthesized in Example 36 "Synthesis of Polymer, 1" is used as a molding material for molding with addition of the compound represented by Structural Formula (7) as the compound having a condensable functional group and a spin-trapping group in an amount of 1%.

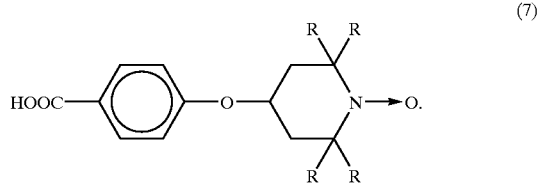

(7)

This molding material is extrusion-molded at 180° C. into a printer case.

(Decomposition of Polymer, 2)

The molded polymer is hydrolyzed in the same manner as in "Decomposition of Polymer, 1" in Example 1. In the hydrolysis of this Example, the compound of Structural Formula (7) having a condensable group and a spin-trapping group need not necessarily be added newly since the compound has been already added.

(Resynthesis of Polymer, 2)

A polymer is produced from the recovered material in the same manner as in "Resynthesis of Polymer, 1". The molecular weight distribution of the resynthesized polymer and that of the polymer before the molding operation are confirmed to be equivalent by GPC.

Example 38

(Synthesis of Polymer, 2)

Two styrene polymers are employed: one having a carboxyl group at the respective ends of the molecule and having a molecular weight of 25,000, and another having a hydroxyl group at the respective ends of the molecule, as the polymers having two condensable functional groups. These compounds are heated together to 180° C. in a flask. Thereto, titanium isopropoxide is added in an amount of 0.5 mass % as the catalyst. The reaction flask is purged by gaseous nitrogen and evacuated gradually to 6.67 kPa to remove the water formed by the dehydration condensation. After 5 hours of the reaction, the polymer is recovered.

(Decomposition of Polymer, 3)

The synthesized polymer in "Synthesis of Polymer, 2" is dissolved N,N'-dimethylformamide (DMF) at a concentration of 10 mass %. Thereto, 1-mol/L (1N) hydrochloric acid is added and the mixture is stirred at 40° C. for 5 hours to hydrolyze the polymer. In the hydrolysis, a compound represented by Structural Formula (6) described in Example 36 is added thereto in an amount of 0.1% based on the polymer as the compound having a condensable functional group and a spin-trapping group.

The resulting styrene polymers, one having a carboxyl group at the respective ends of the molecule and having a molecular weight of 25,000, and the other one having a hydroxyl group at the respective ends of the molecule and having a molecular weight of 25,000, are recovered by repetition of dissolution in toluene and precipitation by methanol.

(Resynthesis of Polymer, 3)

A polymer is synthesized by dehydration condensing the styrene polymer having a carboxyl group at the respective ends of the molecule and having a molecular weight of 25,000 and the one having a hydroxyl group at the respective ends of the molecule and having a molecular weight of 25,000 which have been recovered in the above "Decomposition of Polymer, 3", in the same manner as in "Synthesis of Polymer, 2" described above.

The polymer has the molecular weight and molecular weight distribution equivalent to the polymer obtained in "Synthesis of Polymer, 2".

Example 39

(Recycling Method)

The polymer obtained in Example 36 is molded in the same manner as "Molding of Polymer, 1" in Example 37 into a printer case. The molded products after use are collected from users. A part of the collected cases are decomposed by the method of "Decomposition of Polymer, 1" of Example 36 to obtain newly a source material for polymer synthesis. From this material, a polymer is synthesized newly by the method of "Resynthesis of Polymer, 1" of Example 36. Separately, the remainder of the collected cases are chipped without preliminary treatment, and formed by a sandwich-molding into printer cases by the method described in Japanese Patent Publication No. 6-24739 (Patent Literature 1).

These recycling steps may be conducted by one and the same company, or may be shared by plural companies.

Reference Example 1

(Decomposition of Polymer 4)

The polymer obtained in Example 36 is hydrolyzed in the same manner as in "Decomposition of Polymer 1" in Example 36 except that the compound of Structural Formula (6) is not added. Thereby the styrene polymer having a carboxyl group at the respective ends and butanediol are recovered.

(Resynthesis of Polymer, 4)

From the recovered styrene polymer having a carboxyl group at the respective ends and butanediol, a polymer is synthesized in the same manner as in "Resynthesis of Polymer, 1" in Example 36.

The polymer obtained in "Synthesis of Polymer, 1" in Example 36 and the polymer obtained this "Resynthesis of Polymer, 4" are subjected to GPC measurement to compare the molecular weight distribution. As the results, the polymer obtained in "Resynthesis of Polymer, 4" has a lower molecular weight.

The present invention provides a novel polymeric material synthesizable and decomposable reversibly. Further, the decomposition-resynthesis technique of the present invention enables a novel material-recycling system with less energy input. Furthermore, the present invention, by being combined with any of reuse technique, material-recycling technique, chemical recycling technique, thermal recycling technique and so forth, enables remarkably effective use of source materials in comparison with conventional techniques, and contributes greatly to construction of sustainable society.

What is claimed is:

1. A polymer represented by Structural Formula (1):

$$[-P_1-R-]_n \quad (1),$$

wherein $P_1$ is an addition polymer moiety having a continuous hydrocarbon skeleton containing no condensation system and formed by addition polymerization of one or more monomers having a double bond; R is a linking moiety comprising a condensation system; and n is a number of repeating units and is an integer of 2 or more, wherein the linking moiety R is represented by Structural Formula (2):

$$X_1\text{-A-}X_2 \quad (2),$$

wherein $X_1$ and $X_2$ are the same atomic group linked to $P_1$ in the Structural formula (1), and selected from the group consisting of —CONH—, —NH—CO—O— and —NH—CO—NH—, and A is an atomic group capable of linking with $X_1$ and $X_2$.

2. The polymer according to claim 1, wherein $X_1$ and $X_2$ are —CONH—.

3. A polymer represented by Structural Formula (1):

$$[-P_1-R-]_n \quad (1),$$

wherein $P_1$ is an addition polymer moiety having a continuous hydrocarbon skeleton containing no condensation system and formed by addition polymerization of one or more monomers having a double bond; R is a linking moiety comprising a condensation system; and n is a number of repeating units and is an integer of 2 or more, wherein the linking moiety R is represented by Structural Formula (2):

$$X_1\text{-A-}X_2 \quad (2),$$

wherein $X_1$ and $X_2$ are, respectively, an atomic group linked to $P_1$ in the Structural formula (1), and A is an atomic group capable of linking with $X_1$ and $X_2$, and wherein A is selected from the group consisting of:
an alkylene group, which has a phenyl group on a side chain;
an alkylene group, which has a phenylene group in a main chain; and
a phenylene group.

4. A composition comprising a mixture of (i) a compound having a condensable functional group and a spin-trapping group; and (ii) a polymer represented by Structural Formula (1):

$$[-P_1-R-]_n \quad (1),$$

wherein $P_1$ is an addition polymer moiety having a continuous hydrocarbon skeleton containing no condensation system and formed by addition polymerization of one or more monomers having a double bond; R is a linking moiety comprising a condensation system; and n is a number of repeating units and is an integer of 2 or more.

5. The composition according to claim 4, wherein the polymer is a condensate of $P_1$ and R.

6. The composition according to claim 4, wherein the compound having a condensable functional group and a spin-trapping group is represented by Structural Formula (3):

$$X_3\text{-}M_1\text{-}X_4 \quad (3),$$

wherein $X_3$ is a condensable functional group; $X_4$ is a spin-trapping group; $M_1$ is selected from the group consisting of —$(CH_2)_{n2}$—, —$C_6H_4$— and —$(CH_2)_{m1}$—$C_6H_4$—$(CH_2)_{m2}$—; and n2, m1 and m2 are, respectively, an integer from 1 to 8.

7. The composition according to claim 6, wherein the compound having the condensable functional group and the spin-trapping group is a nitroso compound.

8. A process for producing a polymer represented by Structural Formula (1), the process comprising:
condensation-polymerizing an addition-polymer having a functional group at each end thereof solely or in a manner of making a two-functional compound intervening therebetween:

$$[-P_1-R-]_n \quad (1),$$

wherein $P_1$ is an addition polymer moiety having a continuous hydrocarbon skeleton containing no condensation system and formed by addition polymerization of one or more monomers having a double bond; R is a linking moiety comprising a condensation system for linking plural $P_1$; and n is a number of repeating units and is an integer of 2 or more; and adding a compound having a condensable functional group and a spin-trapping group to the polymer represented by the above Structural Formula (1).

9. The process according to claim 8, wherein the polymer is selected from the group consisting of:

(i) the compound of the Structural Formula (1), wherein the linking moiety R is selected from the group consisting of —CO—O—, —CONH—, —NH—CO—O— and —NH—CO—NH—;

(ii) the compound of the Structural Formula (1), wherein linkage sites of R represented by the bond between $P_1$ and R in the repeating unit of the Structural Formula (1) are the same throughout the repeating units;

(iii) the compound of the Structural Formula (1), wherein linkage sites of R represented by the bond between $P_1$ and R in a repeating unit of the Structural Formula (1) are different between adjacent repeating units;

(iv) the compound of the Structural Formula (1), wherein linkage sites of R represented by the bond between $P_1$ and R in the repeating unit of Structural formula (1) may be the same or different between the adjacent repeating units;

(v) the compound of the Structural Formula (1), wherein the linking moiety R is represented by Structural Formula (2): $X_1$-A-$X_2$ (2), in which $X_1$ and $X_2$ are, respectively, an atomic group linked to $P_1$, and A is an atomic group capable of linking with $X_1$ and $X_2$;

(vi) the compound as in said part (v), wherein $X_1$ and $X_2$ are independently selected from the group consisting of —CO—O—, —CONH—, —NH—CO—O— and —NH—CO—NH—;

(vii) the compound as in said part (v), wherein $X_1$ and $X_2$ are the same atomic group;

(viii) the compound as in said part (vii), wherein the same atomic group is —CONH—;

(ix) the compound as in said part (v), wherein $X_1$ and $X_2$ are different from each other;

(x) the compound as in said part (v), wherein A is an alkylene group;

(xi) the compound as in said part (x), wherein the alkylene group has a phenyl group on a side chain;

(xii) the compound as in said part (x), wherein the alkylene group has a phenylene group in a main chain;

(xiii) the compound as in said part (v), wherein A is phenylene group; and (xiv) the compound of the Structural Formula (1), wherein the addition polymer moiety $P_1$ is at least one moiety selected from the group consisting of polystyrene, polybutadiene, polyacrylonitrile, polyethylene and polypropylene.

10. The process for producing the polymer according to claim 8, wherein the compound having the condensable functional group and the spin-trapping group is represented by Structural Formula (3):

$$X_3\text{-}M_1\text{-}X_4 \qquad (3),$$

wherein $X_3$ is a condensable functional group; $X_4$ is a spin-trapping group; and $M_1$ is selected from the group consisting of —$(CH_2)_{n2}$—, —$C_6H_4$— and —$(CH_2)_{m1}$—$C_6H_4$—$(CH_2)_{m2}$—, and n2, m1 and m2 are, respectively, an integer from 1 to 8.

11. A polymer represented by Structural Formula (1):

$$[-P_1-R-]_n \qquad (1),$$

wherein $P_1$ is an addition polymer moiety having a continuous hydrocarbon skeleton containing no condensation system and formed by addition polymerization of one or more monomers having a double bond; R is a linking moiety comprising a condensation system; and n is a number of repeating units and is an integer of 2 or more, wherein the linking moiety R is represented by Structural Formula (2):

$$X_1\text{-A-}X_2 \qquad (2),$$

wherein $X_1$ and $X_2$ are different atomic groups linked to $P_1$ in the Structural formula (1), and A is an atomic group capable of linking with $X_1$ and $X_2$, and wherein linkage sites of $X_1$ and/or $X_2$ to A are different from each other in adjacent repeating units.

* * * * *

UNITED STATES PATENT AND TRADEMARK OFFICE
CERTIFICATE OF CORRECTION

PATENT NO. : 7,009,007 B2
APPLICATION NO. : 10/443089
DATED : March 7, 2006
INVENTOR(S) : Hiroshi Maehara et al.

It is certified that error appears in the above-identified patent and that said Letters Patent is hereby corrected as shown below:

COLUMN 1

Line 30, "reused seldom." should read --seldom reused.--;
Line 34, "the" should be deleted; and
Line 39, "expected" should read --anticipated--.

COLUMN 2

Line 10, "requires" should read --require--; and
Line 42, "this" should read --these--.

COLUMN 9

Line 53, "intends" should read --intend--; and
Line 54, "a" should be deleted; and "is" should read --are--.

COLUMN 10

Line 17, "differently" should read --different--.

COLUMN 17

Line 6, "$PS \quad COO \atop (50,000)$" should read --$PS \quad COO \atop (50,000)$--.

COLUMN 19

Line 6, "had" should be deleted.

COLUMN 23

Line 62, "Structural formula (1)," should read --Structural Formula (1),--.

COLUMN 24

Line 15, "Structural formula (1)," should read --Structural Formula (1),--; and
Line 18, close up right margin.

UNITED STATES PATENT AND TRADEMARK OFFICE
CERTIFICATE OF CORRECTION

PATENT NO. : 7,009,007 B2
APPLICATION NO. : 10/443089
DATED : March 7, 2006
INVENTOR(S) : Hiroshi Maehara et al.

It is certified that error appears in the above-identified patent and that said Letters Patent is hereby corrected as shown below:

COLUMN 25

Line 20, "Structural formula (1)," should read --Structural Formula (1),--.

COLUMN 26

Line 4, "phenylene" should read --a phenylene--; and
Line 36, "Structural formula (1)," should read --Structural Formula (1),--.

Signed and Sealed this

Tenth Day of October, 2006

JON W. DUDAS
*Director of the United States Patent and Trademark Office*